(12) United States Patent
Lee

(10) Patent No.: US 12,145,615 B2
(45) Date of Patent: Nov. 19, 2024

(54) DRIVER ASSISTANCE SYSTEM AND METHOD THEREOF

(71) Applicant: HL MANDO CORPORATION, Pyeongtaek-si (KR)

(72) Inventor: Yunbin Lee, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 81 days.

(21) Appl. No.: 18/116,660

(22) Filed: Mar. 2, 2023

(65) Prior Publication Data

US 2023/0278576 A1    Sep. 7, 2023

(30) Foreign Application Priority Data

Mar. 4, 2022    (KR) .......................... 10-2022-0028130

(51) Int. Cl.
*B60W 50/14* (2020.01)
*B60W 50/12* (2012.01)

(52) U.S. Cl.
CPC ............ *B60W 50/14* (2013.01); *B60W 50/12* (2013.01); *B60W 2050/143* (2013.01); *B60W 2050/146* (2013.01); *B60W 2555/20* (2020.02); *B60W 2556/45* (2020.02); *B60W 2720/10* (2013.01)

(58) Field of Classification Search
CPC ..... B60W 2050/143; B60W 2050/146; B60W 2555/20; B60W 2555/60; B60W 2556/45; B60W 2556/50; B60W 2720/10; B60W 30/146; B60W 50/12; B60W 50/14
See application file for complete search history.

(56) References Cited

U.S. PATENT DOCUMENTS

| 6,693,555 | B1 * | 2/2004 | Colmenarez ..... G08G 1/096716 340/602 |
| 8,311,734 | B2 | 11/2012 | Georgis et al. |
| 10,988,146 | B1 | 4/2021 | Kruse et al. |
| 2009/0093927 | A1 * | 4/2009 | Mueller-Schneiders ..................... G01C 21/26 701/36 |
| 2016/0347312 | A1 * | 12/2016 | Tomatsu ............... B60W 50/14 |
| 2021/0155235 | A1 * | 5/2021 | Yang ..................... B60W 50/14 |

FOREIGN PATENT DOCUMENTS

| KR | 10-2009-0009473 A | 1/2009 |
| KR | 10-2017-0043168 A | 4/2017 |
| WO | WO-2009013739 A1 * | 1/2009 ............ G01S 17/74 |

* cited by examiner

*Primary Examiner* — Omer S Khan
(74) *Attorney, Agent, or Firm* — Hauptman Ham, LLP

(57) ABSTRACT

A driver assistance system for assisting traveling of a vehicle may include: a transceiver configured to perform communication with an external server and internal communication with the vehicle; and a controller configured to perform a maximum traveling speed limit control for the vehicle based on weather information received by the transceiver from the external server, and information received from a sensor for sensing whether wipers are operating and a navigation system for receiving road information.

6 Claims, 8 Drawing Sheets

DRIVER ASSISTANCE SYSTEM AND METHOD THEREOF

CROSS-REFERENCE TO RELATED APPLICATION

This application claims the benefit of Korean Patent Application No. 10-2022-0028130, filed on Mar. 4, 2022 in the Korean Intellectual Property Office, the disclosure of which is incorporated herein by reference.

BACKGROUND

1. Field

The present disclosure relates to a driver assistance system and a method thereof, and more particularly, to a driver assistance system for limiting a maximum traveling speed of a vehicle and a method thereof.

2. Description of the Related Art

A vehicle means a device capable of transporting people or things to a destination while traveling on a road or track. The vehicle can be moved to any of various positions mainly using one or more wheels installed at a vehicle body. The vehicle may include a three-wheeled or four-wheeled automobile and a two-wheeled vehicle such as a motorcycle, construction machine, a bicycle, and the like.

In recent years, in order to reduce the burden on a driver and enhance convenience, research has been actively conducted on a vehicle equipped with an Advanced Driver Assist System (ADAS) which actively provides information on a vehicle state, a driver state, and a surrounding environment.

In the case of traveling on a road allowing high-speed traveling when it snows or rains, a vehicle may slip on a slippery road surface and there is a high risk of accident. In this case, the vehicle should reduce the speed, but this rule is often not observed.

Therefore, there is a need for a technique for automatically limiting a maximum traveling speed of a vehicle when a road surface is slippery on a road allowing high-speed traveling and there is a high risk of accident.

SUMMARY

The present disclosure provides a driver assistance system for limiting a maximum speed for a vehicle to run based on information on whether wipers are operating, current weather information, and information on a current traveling road, and a method thereof.

In one aspect, a driver assistance system includes: a transceiver configured to perform communication with an external server and internal communication with a vehicle; and a controller configured to perform a maximum traveling speed limit control for the vehicle based on weather information received by the transceiver from the external server, and information received from a sensor for sensing whether wipers are operating and a navigation system for receiving road information.

The controller may start a maximum traveling speed limit control for the vehicle based on determining that the wipers are operating based on information detected by the sensor.

The controller may perform the maximum traveling speed limit control for the vehicle based on a maximum limit speed of a current traveling road received from the navigation system being greater than or equal to a first speed.

The controller may control the transceiver to receive information on whether any weather alert has been issued based on determining that an amount of rainfall or snow is equal to or greater than a predetermined value based on the information received by the transceiver.

The controller may set a maximum traveling speed of the vehicle to a second speed based on determining that a weather alert has been issued based on the information received by the transceiver.

The controller may set a maximum traveling speed of the vehicle to a third speed based on determining that any weather alert has been issued based on the information received by the transceiver.

The third speed may be a value greater than the second speed.

The driver assistance system may further include a plurality of Electronic Control Units (ECUs). The controller may generate a control signal so that the plurality of the ECUs operate to perform the maximum traveling speed limit control.

The driver assistance system may further include a speaker and a display, and the controller may control a speaker or a display to provide a notification to a user in the case of performing the maximum traveling speed limit control.

In another aspect, a driver assistance method includes: performing communication with an external server and internal communication with a vehicle; and performing a maximum traveling speed limit control for the vehicle based on weather information received by the transceiver from the external server, and information received from a sensor for sensing whether wipers are operating and a navigation system for receiving road information.

The performing of the maximum traveling speed limit control for the vehicle may comprise starting the maximum traveling speed limit control for the vehicle based on determining that the wipers are operating based on the detected information.

The performing of the maximum traveling speed limit control for the vehicle may comprise performing the maximum traveling speed limit control for the vehicle based on determining that a maximum traveling speed limit of a current traveling road is equal to or greater than a first speed based on the received information.

The performing of the maximum traveling speed limit control for the vehicle may comprise receiving information on whether or not any weather alert has been issued based on determining that an amount of rainfall or snow is equal to or greater than a predetermined value based on the received information.

The performing of the maximum traveling speed limit control for the vehicle may comprise setting a maximum traveling speed of the vehicle to a second speed based on determining that the weather alert has been issued based on the received information.

The performing of the maximum traveling speed limit control for the vehicle may comprise setting a maximum traveling speed of the vehicle to a third speed based on determining that a weather alert has been issued based on the received information.

The third speed may be a value greater than the second speed.

The performing of the maximum traveling speed limit control for the vehicle may comprise generating a control signal so that a plurality of Electronic Control Units (ECUs) operate to perform the maximum rate limit control.

The driver assistance method may further include controlling a speaker or display to provide an alert to the user in the case of performing the maximum traveling speed limit control.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
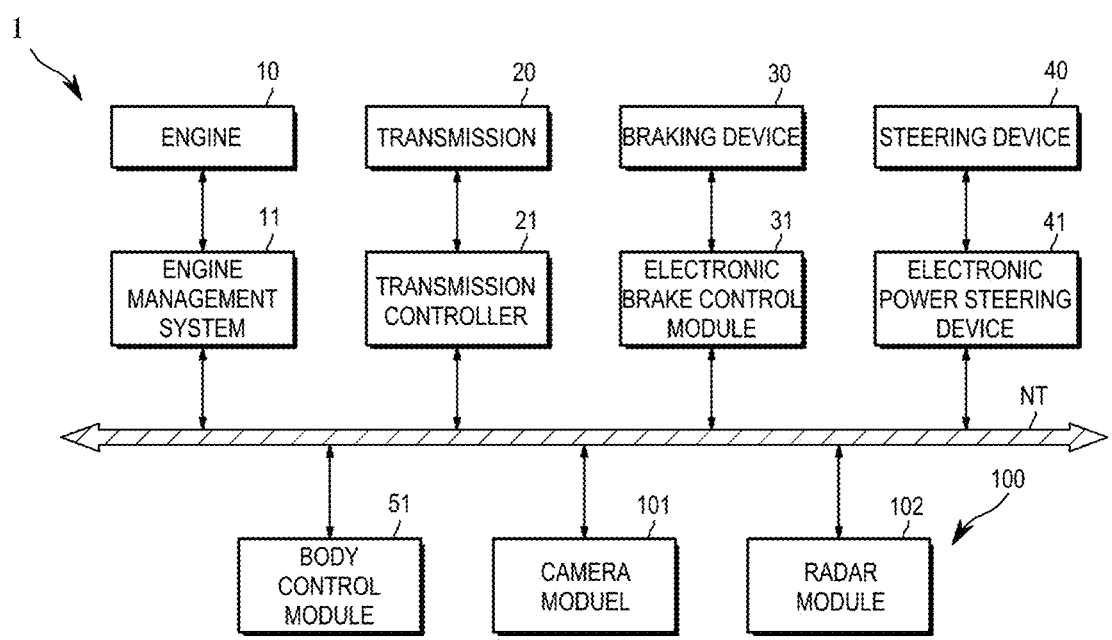
FIG. 1 illustrates a configuration of a vehicle according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

FIG. 1 illustrates a configuration of a vehicle according to an embodiment.

As shown in FIG. 1, a vehicle 1 includes an engine 10, a transmission 20, a braking device 30, and a steering device 25. The engine 10 includes a cylinder and a piston, and may generate power for the vehicle 1 to travel. The transmission 20 includes a plurality of gears, and may transmit the power generated by the engine 10 to wheels. The braking device 30 may decelerate the vehicle 1 or stop the vehicle 1 based on friction with the wheels. The steering device 2 may change a traveling direction of the vehicle 1.

The vehicle 1 may include a plurality of electrical components. For example, the vehicle 1 may include an engine management system (EMS) 11, a transmission control unit (TCU) 21, an electronic brake control module 31, an electronic power steering (EPS) device 41, a body control module (BCM), a driver assistance system (DAS), and a user interface.

The engine management system 11 may control the engine 10 in response to a driver's intention of acceleration or a request from the driver assistance system through an accelerator pedal. For example, the engine management system 11 may control a torque of the engine 10.

The engine management system 11 performs fuel injection control, fuel economy feedback control, lean burn control, ignition timing control, idle speed control, and the like. The engine management system 11 may be a single device and may also be a plurality of devices connected through communication.

The transmission controller 21 may control the transmission 20 in response to the driver's shift command through a gear-shift lever and/or a traveling speed of the vehicle 1. For example, the transmission controller 10 may adjust a transmission gear ratio from the engine 10 to the wheels.

The electronic brake control module 31 may control the brake device 30 in response to the driver's intention of braking through a brake pedal and/or a slip of the wheels. For example, the electronic brake control module 1 may temporarily release the braking of the wheels in response to a wheel slip detected at the time of braking the vehicle 1 (Anti-lock Braking Systems (ABS)). The electronic brake control module 1 is capable of selectively releasing the braking of the wheels in response to oversteering and/or understeering detected during steering of the vehicle 1 (electronic stability control (ESC)). In addition, the electronic brake control module 1 may temporarily brake the wheels in response to a slip of the wheels detected when the vehicle 1 is being driven (Traction Control System (TCS)).

The electronic steering device 41 may assist the operation of the steering device so as to enable the driver to easily operate steering wheels in response to the driver's intention of steering through the steering wheels. For example, the electronic steering device 41 may assist the operation of the steering device 40 so as to reduce a steering force during low-speed traveling or parking and to increase a steering force during high-speed traveling.

The body control module may control the operation of electrical components that provide comfort and convenience to the driver or ensure safety of the driver. For example, the body control module may control a headlamp, a wiper, a cluster, a multi-functional switch, a signal light, and the like.

The driver assistance system may assist the driver to operate (drive, brake, and steer) the vehicle 1. For example, the driver assistance system driver may detect an environment (e.g., another vehicle, a pedestrian, a cyclist, a lane, a road sign, a traffic light, etc.) of a road on which the vehicle 1 is traveling, and may control driving and/or braking and/or steering of the vehicle 1 in response to the detected environment.

The driver assistance system 100 may provide the driver with various functions. For example, the driver assistance system may provide a lane departure warning (LDW), a lane keeping assistant (LKA), a high beam assistant (HBA) function, an automatic emergency braking (AEB), a traffic sign recognition (TSR), a smart cruise control (SCC), a blind spot detection (BSD), and the like.

The driver assistance system includes a camera module 101 for obtaining image data on the surroundings of the vehicle 1, and a radar module 102 for obtaining object data in an environment of the vehicle 1. The camera module 101 may include a camera and a controller (Electronic controller, ECU), and may capture an image of the front of the vehicle 1 to recognize another vehicle, a pedestrian, a cyclist, a lane, a road sign, a traffic light, and the like. The radar module 102 may include a radar and a controller, and may acquire a relative position, a relative speed, and the like of an object (for example, another vehicle, a pedestrian, a cyclist, and the like) around the vehicle 1.

That is, the driver assistance system 100 may process image data obtained by a camera module and sensing data (radar data) obtained by a radar module, and in response to processing of the image data and the radar data, detect an environment of a road on which the vehicle 1 is traveling, a front object located in front of the vehicle 1, and a side object located on the side of the vehicle 1.

The driver assistance system is not limited to that shown in FIG. 1, and may further include a lidar capable of scanning the surroundings of the vehicle 1 and detecting an object.

The above electronic components may communicate with one another via a vehicle communication network (NT). For example, the electrical components may transmit and receive data through Ethernet, (Media Oriented Systems Transport (MOST), FlexRay, CAN (Controller Area Network (CAN), Local Interconnect Network (LIN), or the like. For example, the driver assistance system 100 may transmit a drive control signal, a braking signal, and a steering signal to the engine management system 11, the electronic brake control module 31 and the electronic steering device 30 via the vehicle communication network NT.

Figure 2:
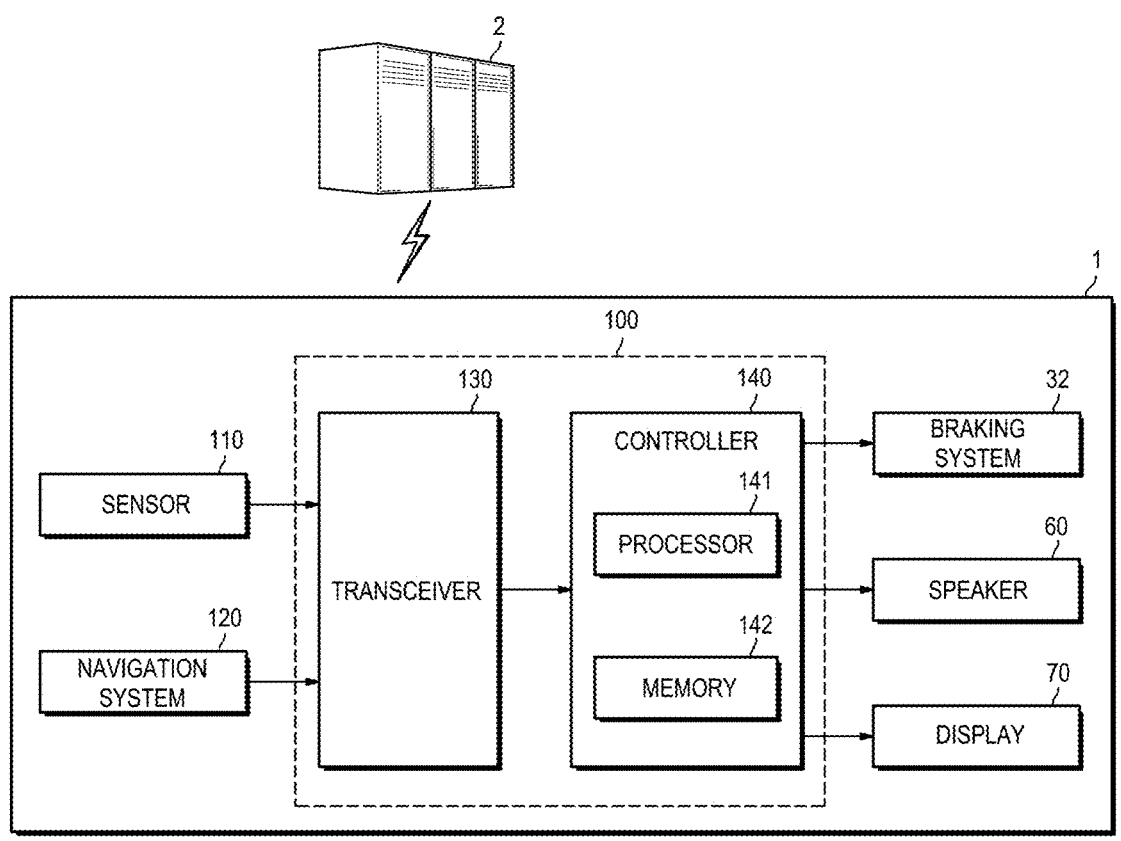
FIG. 2 illustrates a configuration of a driver assistance system according to an embodiment.

FIG. 2 illustrates a configuration of a driver assistance system according to an embodiment.

As shown in FIG. 2, a vehicle 1 may include a braking system 32, a speaker 60, a display 70, a sensor 110, a navigation system 120, and a driver assistance system 100.

A braking system 32 may include an electronic braking control module (see FIG. 1) and a braking device (see FIG. 1). Each of the speaker 60 and the display 70 may provide a driver with a notification in the form of audio and video.

The sensor 110 may detect whether a wiper is operating.

The navigation system 120 may receive road information. For example, the navigation system 120 may check a road on which the vehicle 1 is now traveling, and may receive information on a maximum traveling speed limit of the road.

A transceiver 130 may receive information from the external server 2 by performing communication with the external server 2. For example, the transceiver 130 may receive information on current weather from the external server 2.

In addition, communication between the components inside the vehicle 1 may be performed. For example, information on whether or not a wiper is operating may be received from the sensor 110, and information on a road on which the vehicle 1 is traveling may be obtained from the navigation system 120.

A controller 140 may include a processor 141 and a memory 142.

Based on information sensed by the sensor 110 and the information received by the navigation system 120 and the transceiver 130, the processor 141 may generate a control signal for limiting a maximum traveling speed of the vehicle 1.

For example, the processor 141 may perform a maximum traveling speed limit control for the vehicle 1 based on whether or not a wiper is operating as sensed by the sensor 110, a maximum traveling speed limit of the current traveling road as received by the navigation system 120, and weather information received by the transceiver 130.

The memory may store a program and/or data for the processor 141 to generate a control signal for limiting a maximum traveling speed of the vehicle.

The memory 120 may temporarily store data sensed by the sensor and/or data received from the navigation system and the transceiver, and may temporarily store a data processing result of the processor 141.

The memory 142 may include a volatile memory such as a RAM (S-RAM) and a DRAM (D-RAM), as well as a non-volatile memory such a flash memory, a Read Only Memory (ROM) and an Erasable Programmable Read Only Memory (EPROM).

The driver assistance system 100 is not limited to that shown in FIG. 2, and may further include various embodiments for limiting a maximum traveling speed of a vehicle.

Hereinafter, a control process of a driver assistance system 100 according to an embodiment will be described.

Figure 3:
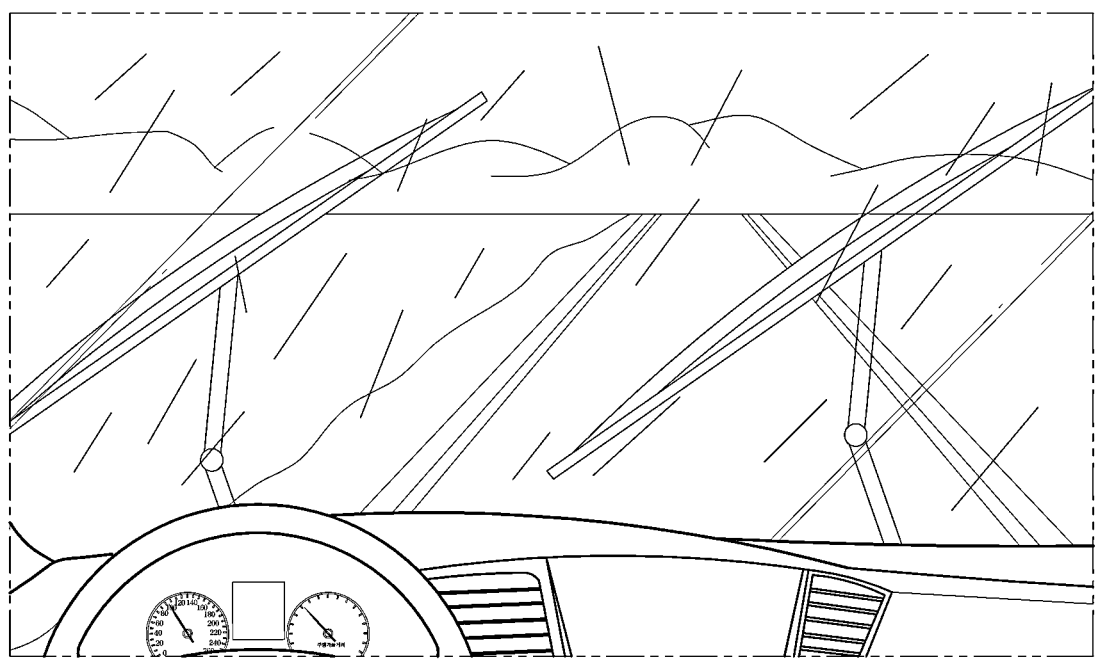
FIG. 3 is a diagram illustrating a case of traveling on a snow or rainy road.
Figure 4:
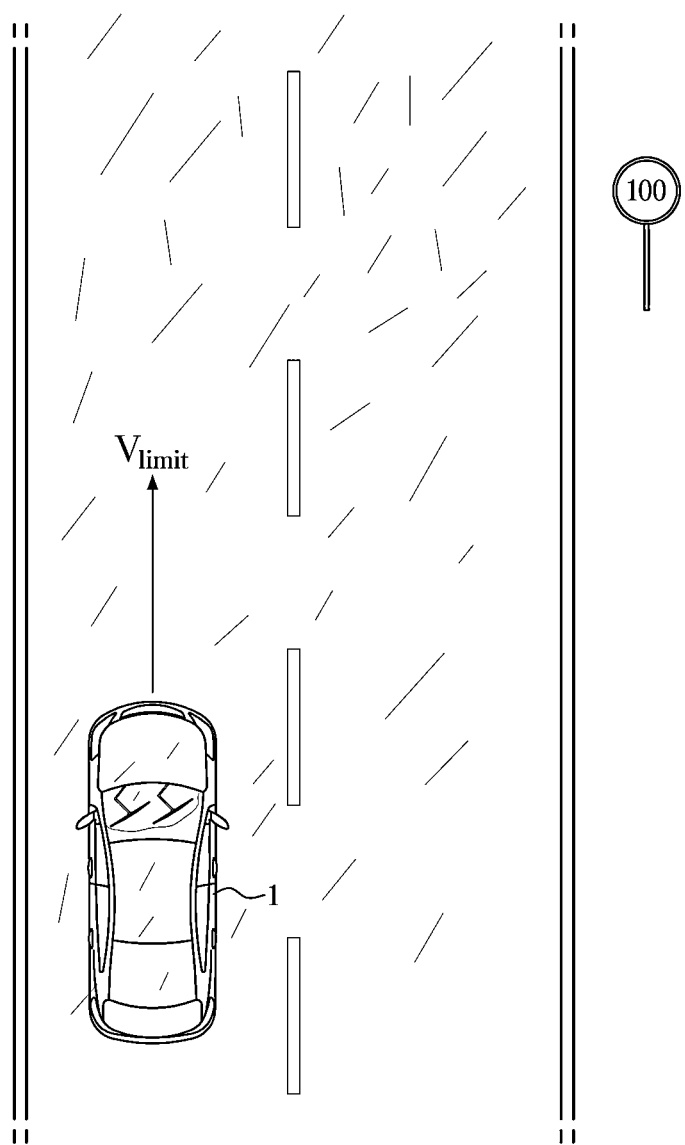
FIG. 4 is a diagram illustrating that a maximum traveling speed is limited on a road on which a vehicle according to an embodiment travels.

FIG. 3 is a view showing a case of traveling on an snow or rainy road, and FIG. 4 is a diagram showing that a maximum traveling speed is limited on a road on which a vehicle is traveling.

In the case of snowing or raining when a vehicle is traveling on a highway on which high-speed traveling is allowed, a possibility of accident may increase due to a slippery road surface. In this case, a driver may operate wipers of the vehicle 1 in order to ensure the visual field.

The sensor 110 may sense whether or not the wipers of the vehicle 1 operate. When the wipers are determined to be operating based on information sensed by the sensor 110, the controller 140 may start a maximum traveling speed limit control for the vehicle 1.

That is, since the driver will preferentially operate the wipers when it snows or rains, the operation of the wipers may be taken as a start point of the maximum traveling speed limit control for the vehicle 1.

In addition, it is possible to check a maximum traveling speed limit of the road on which the vehicle 1 is now traveling in order to perform the maximum-speed limit control for the vehicle 1.

In general, since there is a high risk of accident on a road that allows traveling at a high speed, the navigation system 120 may identify the current traveling road and receive information on the highest speed limit of the current traveling road.

If the maximum traveling speed limit of the current traveling road received from the navigation system is equal to or higher than a first speed, the controller 140 may perform the maximum-speed limit control for the vehicle 1.

In this case, the first speed may be 70 km/h. This is merely an example, and the first speed may vary depending on the current traveling road of the vehicle 1 or the like.

That is, when the driver operates the wipers of the vehicle 1 and the maximum traveling speed limit of the current traveling road of the vehicle 1 is equal to or higher than the first speed, the controller 140 may determine that it is snowing or raining on a road that allows traveling at a high speed and thus may perform a control to limit the maximum traveling speed.

Figure 5:
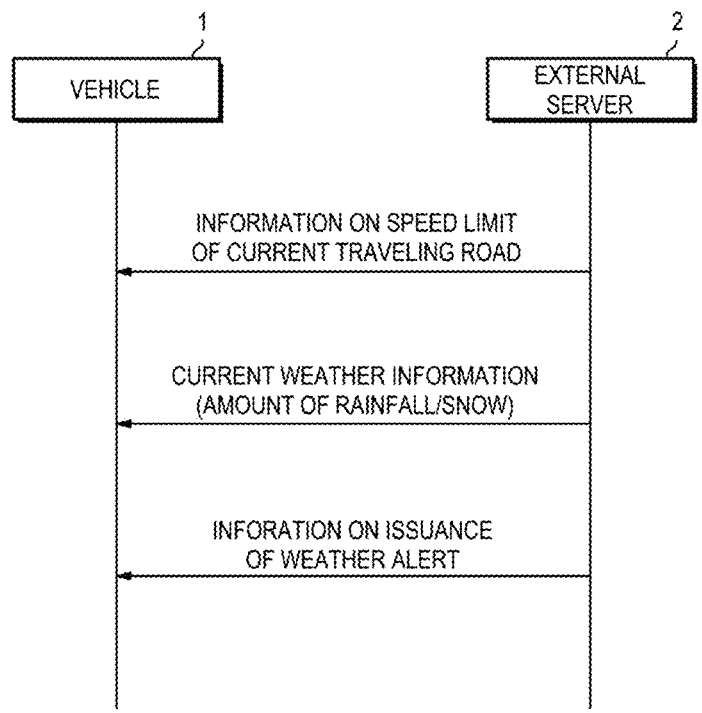
FIG. 5 is a diagram illustrating information received from an external server according to an embodiment.

FIG. 5 is a diagram illustrating information received from an external server.

As described above, the navigation system 120 of the driver assistance system 100 may check a current traveling road of the vehicle 1 and receive information on a maximum traveling speed limit of the current traveling road.

In addition, the transceiver 130 may receive from the external server 2 information associated with a current weather environment, for example, information on whether it is snow raining or snowing, and information on an amount of rainfall or snow.

When it is determined that the amount of rainfall or snow is equal to or greater than a predetermined value based on the information received by the transceiver 130, the controller 140 may control the transceiver 130 to receive information on whether a weather alert has been issued.

Information on the predetermined value may be stored in a memory device, and the predetermined value may be, for example, 20 mm/h. This is also merely an example, and the predetermined value may vary depending on a weather environment or the like.

The transceiver 130 may receive information on whether a weather alert has been issued from the external server 2.

That is, the navigation system 120 and the transceiver 130 of the driver assistance system 100 may receive information on a current traveling road and information associated with a current weather environment from the external server 2, and the controller 140 may perform a control to limit the maximum traveling speed of the vehicle 1 based on the received information.

Figure 6:
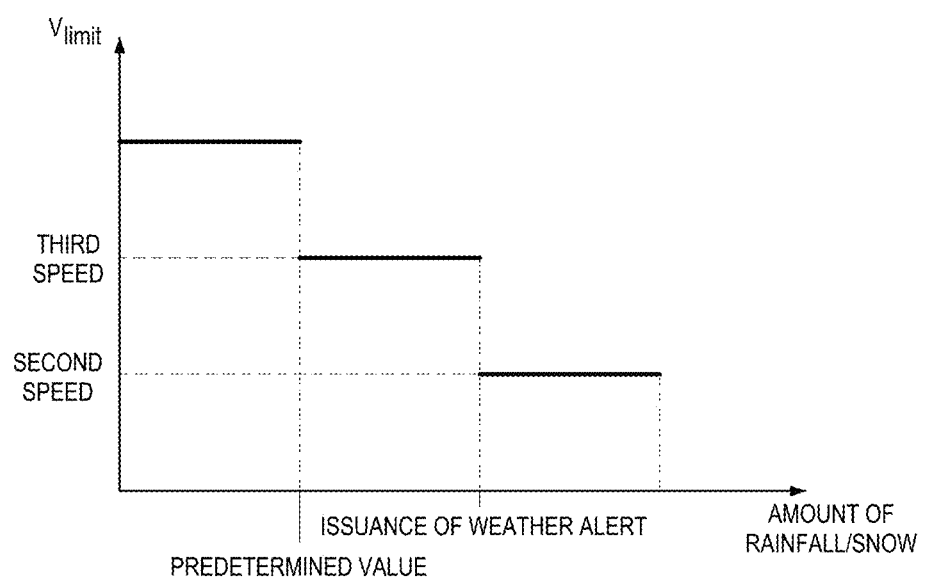
FIG. 6 is a graph showing a maximum traveling speed of a vehicle depending on an amount of rainfall/snow according to an embodiment.

FIG. 6 is a graph showing a maximum traveling speed of a vehicle according to an amount of rainfall/snow.

In a general driving situation, the vehicle 1 may be able to travel at a maximum traveling speed limit that is set when the vehicle 1 is produced.

At this point, if it rains or snows so the driver operates wipers, the sensor may detect the operation of the wipers and the controller 140 may start a maximum traveling speed limit control for the vehicle based on the sensing by the sensor 110. That is, in order to collect information on the maximum traveling speed limit control, the navigation system 120 and the transceiver 130 may be controlled.

When it is determined that a maximum traveling speed limit of the current traveling road on which the vehicle 1 is traveling is equal to or higher than a first speed based on information received by the navigation system 120, the transceiver 130 may receive information on a current amount of rainfall or snow from the external server 2.

The controller 140 may perform the maximum traveling speed limit control for the vehicle when it is determined that the amount of rainfall or snow is equal to or greater than a predetermined value based on the information received by the transceiver 130.

In this case, if a weather condition is bad to a point to issue a weather alert, the amount of rainfall/snow is high and a risk level may further increase. For this reason, the controller 140 may control the transceiver 130 to receive information on whether or not a weather alert has been issued at present.

The transceiver 130 may receive from the external server 2 information on whether or not the weather alert has been issued, and the controller 140 may set the maximum traveling speed limit of the vehicle 1 based on the received information.

When it is determined by the transceiver 130 that the weather alert has been issued based on the received information, the controller 140 may perform a control to set the maximum traveling speed of the vehicle 1 to a second speed.

Further, when it is determined that the weather alert has not been issued based on the information received by the transceiver 130, the controller 140 may perform a control to set the maximum traveling speed of the vehicle 1 to a third speed.

The third speed may be a value greater than the second speed, since the maximum traveling speed of the vehicle 1 is further limited when a weather alert is issued.

Figure 7:
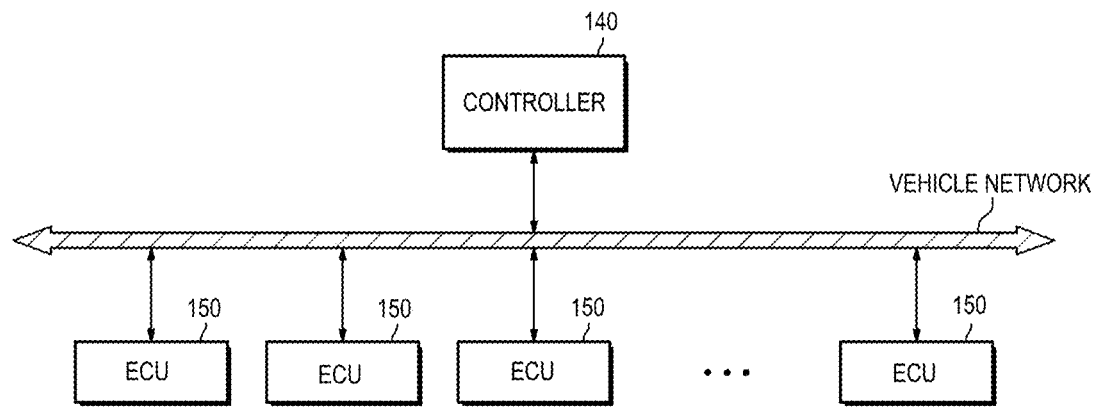
FIG. 7 is a diagram illustrating that a controller according to an embodiment controls a plurality of Electronic Control Units (ECUs)

For example, the third speed may be a speed limited by 30% of the maximum traveling speed, and the second speed may be a speed limited by 20% of the maximum traveling speed. This is also merely an example, and the second and third speeds may be set to different values in order to ensure the safety of the driver. FIG. 7 is a diagram illustrating that a controller controls a plurality of ECUs.

The controller 140 may generate a control signal such that a plurality of ECUs operates to perform the maximum traveling speed limit control for the vehicle 1.

The control signal is transmitted to the plurality of ECUs via a network for the vehicle 1, and the network for the vehicle 1 may include at least one of CAN, LIN, FlexRay, and Ethernet.

The plurality of ECUs may operate in accordance with the control signal to limit the maximum traveling speed of the vehicle 1.

Figure 8:
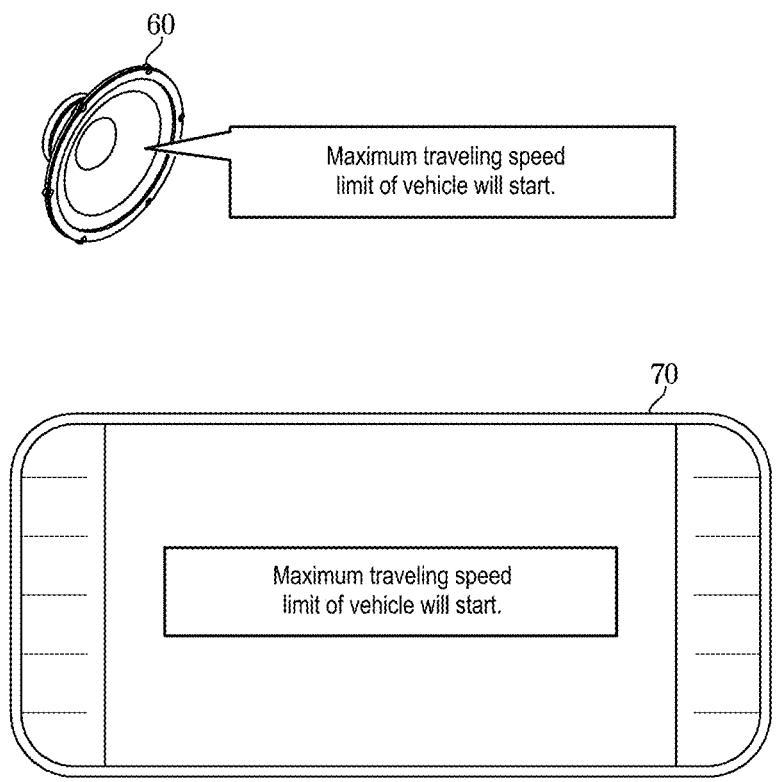
FIG. 8 is a diagram illustrating a case of providing a notification to a driver according to an embodiment.

FIG. 8 is a diagram illustrating a case of providing a notification to a driver according to an embodiment.

When limiting the maximum traveling speed of the vehicle 1, it is necessary to provide a notification so that the driver can perceive the limiting.

Therefore, when performing the maximum traveling speed limit control, the controller 140 may control a speaker 60 or a display 70 to provide a notification to a user.

The notification indicating the maximum traveling speed limit, which is provided to the driver, may be provided in the form of a voice through the speaker 60 or in the form of an image through the display 70.

The controller 140 may control the speaker 60 to provide a driver notification in the form of a voice saying "Maximum traveling speed limit of the vehicle 1 will start1", and may control the display 70 to provide a driver notification in the form of an image with a sentence saying "Maximum traveling speed limit of the vehicle 1 will start".

It is also possible to provide a notification indicating information on the limited maximum traveling speed. For example, when the maximum traveling speed of the vehicle 1 is limited to a second speed, a relevant notification may be provided.

Through this notification, the driver may be able to perceive that the maximum traveling speed of the vehicle 1 is limited.

Figure 9:
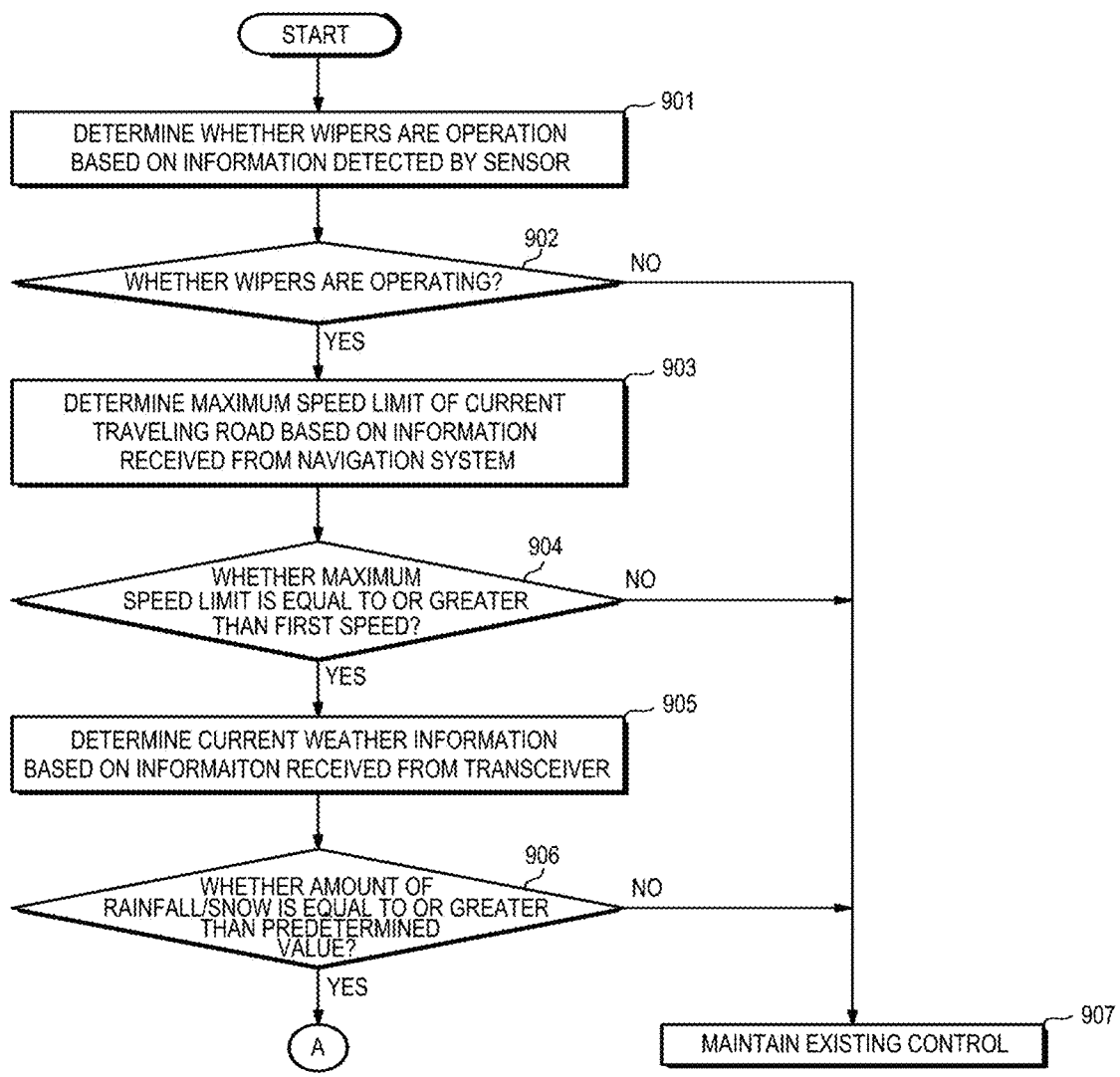
FIG. 9 is a flowchart of a driver assistance method according to an embodiment.
Figure 10:
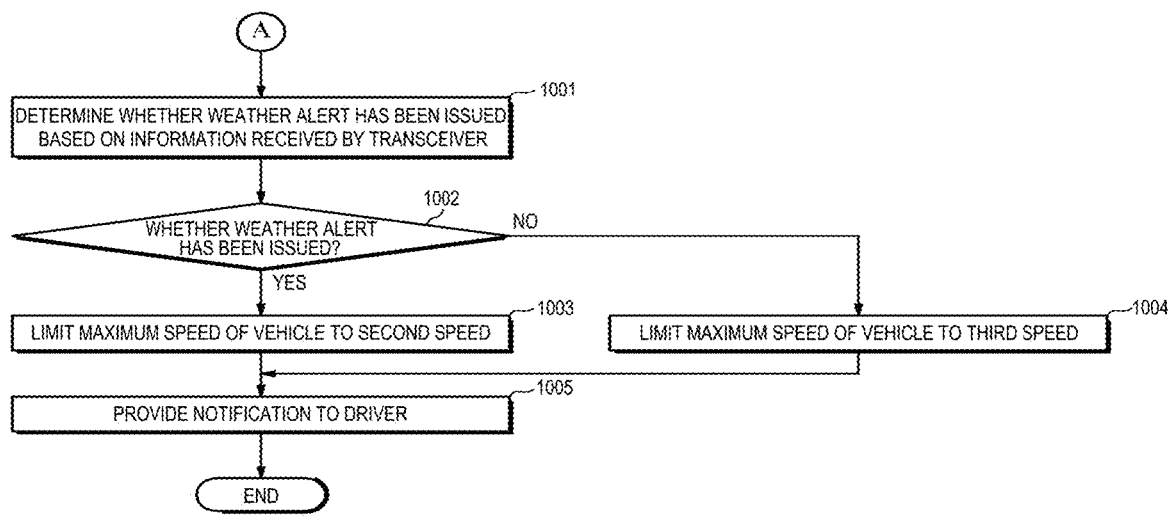
FIG. 10 is a flowchart of a driver assistance method according to an embodiment.

FIGS. 9 and 10 illustrate flowcharts of a driver assistance method according to an embodiment.

First, it is possible to check whether or not wipers of the vehicle 1 are operating in order to limit a maximum traveling speed of the vehicle 1.

That is, it is possible to determine whether or not the wipers are operating based on information detected by the sensor 110 (Operation 901).

When it is determined that the wipers are operating as a result of the sensing (YES in operation 902), the maximum traveling speed limit of the current traveling road may be determined based on information received from the navigation system 120 (operation 903).

When it is determined that the maximum traveling speed limit of the current traveling road is equal to or greater than a first speed (YES in operation 904), current weather information may be determined based on information received from the communicator part 130 (operation 905).

If the wipers are not determined to be operating (NO in operation 902), if the maximum speed limit of the current traveling road is equal to or less than a first speed (NO in operation 904), or if a current amount of rainfall or snow is equal to or less than a predetermined value (NO in operation 906), it is possible to maintain an existing control without limiting the maximum traveling speed of the vehicle 1.

When it is determined, based on information received from the transceiver, that the current rainfall amount/explosion amount is equal to or greater than a predetermined value (YES in operation 906), it may be determined whether a weather alert has been issued. (operation 1001)

When it is determined that the weather alert has been issued (YES in operation 1002), the maximum traveling speed of the vehicle 1 may be limited to the second speed. (operation 1003)

If it is determined that the weather alert has not been issued (NO in operation 1002), the maximum traveling speed of the vehicle 1 may be limited to the third speed (operation 1004).

When the maximum traveling speed of the vehicle 1 is limited in this way, a notification may be provided to a driver so that the driver can perceive the notification (operation 1005).

The notification may be provided in the form of a voice through the speaker 60 provided in the vehicle 1 or in the form of an image through the display 70.

According to an aspect of the present disclosure, it is possible to reduce a risk of an accident due to a slippery road surface by limiting the maximum traveling speed of a vehicle in a situation where the risk of an accident is high.

According to an aspect of the present discloser, it is possible to provide a driver driving assistance system and a method thereof, which can reduce a risk of an accident due to a slippery road surface by limiting the maximum traveling speed of a vehicle in a situation in which the risk of an accident is high.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A driver assistance system comprising:
a controller of a vehicle; and
a transceiver configured to perform communication with an external server and internal communication with the controller of the vehicle,
wherein
the controller is configured to perform a maximum traveling speed limit control for the vehicle based on weather information received by the transceiver from the external server and provided to the controller, sensor information received from a sensor for sensing whether wipers are operating, and road information received from a navigation system,
the controller starts the maximum traveling speed limit control for the vehicle based on determining that the wipers are operating based on information detected by the sensor, the controller performs the maximum traveling speed limit control for the vehicle based on a maximum limit speed of a current traveling road received from the navigation system being greater than or equal to a first speed, the controller controls the transceiver to receive information on whether any weather alert has been issued based determining that an amount of rainfall or snow is equal to or greater than a predetermined value based on the weather information received by the transceiver and provided to the controller, and the controller performs the maximum traveling speed limit control by setting a maximum traveling speed of the vehicle to a second speed based on determining that a weather alert has been issued based on the weather information received by the transceiver and provided to the controller.

2. The driver assistance system of claim 1, further comprising:

a plurality of Electronic Control Units (ECUs), wherein the controller generates a control signal so that the plurality of ECUs operate to perform the maximum speed limit control.

3. The driver assistance system of claim 1, wherein the controller controls a speaker or a display to provide a notification to a user in the case of performing the maximum traveling speed limit control.

4. A driver assistance method comprising:

performing, by a transceiver, communication with an external server and internal communication with a controller of a vehicle; and performing, by the controller, a maximum traveling speed limit control for the vehicle based on weather information received by the transceiver from the external server and provided to the controller, sensor information received from a sensor for sensing whether wipers are operating, and road information received from a navigation system, wherein the performing of the maximum traveling speed limit control for the vehicle comprises starting the maximum traveling speed limit control for the vehicle based on determining that the wipers are operating based on information detected by the sensor, the performing of the maximum traveling speed limit control for the vehicle comprises performing the maximum traveling speed limit control for the vehicle based on that a maximum traveling speed limit of a current traveling road is equal to or greater than a first speed, the performing of the maximum traveling speed limit control for the vehicle comprises receiving information on whether or not any weather alert has been issued based on determining that an amount of rainfall or snow is equal to or greater than a predetermined value based on the weather information received by the transceiver and provided to the controller, and the performing of the maximum traveling speed limit control for the vehicle comprises setting a maximum traveling speed of the vehicle to a second speed based on determining that a weather alert has been issued based on the weather information received by the transceiver and provided to the controller.

5. The driver assistance method of claim 4, wherein the performing of the maximum traveling speed limit control for the vehicle comprises generating a control signal so that a plurality of ECUs operate to perform the maximum traveling speed limit control.

6. The driver assistance method of claim 4, further comprising:

controlling a speaker or display to provide an alert to the user in the case of performing the maximum traveling speed limit control.

* * * * *